(12) United States Patent
Ruopp

(10) Patent No.: US 7,992,420 B2
(45) Date of Patent: Aug. 9, 2011

(54) METHOD FOR THE PRODUCTION OF A HOUSING OF A BRAKE CALIPER

(75) Inventor: Michael Ruopp, Berghülen (DE)

(73) Assignee: Gustav Magenwirth GmbH & Co. KG, Bad Urach (DE)

( * ) Notice: Subject to any disclaimer, the term of this patent is extended or adjusted under 35 U.S.C. 154(b) by 0 days.

(21) Appl. No.: 12/574,821

(22) Filed: Oct. 7, 2009

(65) Prior Publication Data

US 2010/0018279 A1    Jan. 28, 2010

Related U.S. Application Data

(62) Division of application No. 11/031,988, filed on Jan. 7, 2005, now Pat. No. 7,610,997.

(30) Foreign Application Priority Data

Jan. 9, 2004    (DE) .......................... 10 2004 001 495

(51) Int. Cl.
*B21D 22/00*    (2006.01)
*B21D 28/00*    (2006.01)

(52) U.S. Cl. ............................... 72/360; 72/357; 72/340

(58) Field of Classification Search .................... 72/356, 72/352, 357, 360
See application file for complete search history.

(56) References Cited

U.S. PATENT DOCUMENTS

| | | | |
|---|---|---|---|
| 3,602,328 A | 8/1971 | Fannin et al. | 188/72.5 |
| 3,654,689 A | 4/1972 | Schwarz | 29/888.041 |
| 3,675,742 A | 7/1972 | Thompson | 188/72.5 |
| 4,068,745 A | 1/1978 | Haraikawa | 188/73.45 |
| 4,093,043 A | 6/1978 | Smith | 188/73.46 |
| 4,093,044 A | 6/1978 | Unterberg | 92/128 |
| 4,496,033 A | 1/1985 | Hall et al. | 188/347 |
| 4,543,812 A * | 10/1985 | Theobald | 72/355.4 |
| 4,771,678 A | 9/1988 | Walker | 188/73.3 |
| 5,390,771 A | 2/1995 | Hinkens et al. | 188/344 |
| 6,695,099 B1 | 2/2004 | Waag | 188/72.5 |
| 2002/0166736 A1 | 11/2002 | Yunba | 188/72.5 |
| 2004/0060781 A1 | 4/2004 | Goebel et al. | 188/73.31 |

FOREIGN PATENT DOCUMENTS

| | | |
|---|---|---|
| DE | 25 57 700 A1 | 6/1977 |
| GB | 909251 | 10/1962 |
| GB | 915741 | 1/1963 |
| GB | 1 387 833 | 3/1975 |

* cited by examiner

*Primary Examiner* — Debra M Sullivan
(74) *Attorney, Agent, or Firm* — Alan Kamrath; Kamrath & Associates PA

(57) ABSTRACT

A brake caliper for a disk brake, in particular for motorcycles and/or bicycles, includes a housing (30) in which a disk space (39) for receiving a brake disk and a brake cylinder (35) for receiving a brake piston (25) are formed. The brake cylinder (35) is connected to the disk space (39) and has, on its side opposite to the disk space (39), an assembly opening (50) through which the brake piston (25) can be inserted into the brake cylinder (35). A closure element (10) closes the assembly opening (50) after the insertion of the brake piston (25) into the brake cylinder (35). A securing element (21) secures the closure element (10) in the assembly opening (50) against forces in the direction of the main axis of the brake cylinder (35).

6 Claims, 7 Drawing Sheets

METHOD FOR THE PRODUCTION OF A HOUSING OF A BRAKE CALIPER

CROSS REFERENCE

The present invention is a division of U.S. application Ser. No. 11/031,988 filed Jan. 7, 2005, now U.S. Pat. No. 7,610,997.

BACKGROUND OF THE INVENTION

1. Field of the Invention

The present invention relates to a brake caliper and a method for the production of a housing of a brake caliper.

2. Description of the Prior Art

In the case of known brake calipers, at least one brake cylinder in the housing is formed for receiving a brake piston. Usually, the brake cylinders are formed by machining. In general, two brake cylinders which are located on opposite sides of a disk space for receiving brake linings and a brake disk are formed in one operation. Such brake calipers and their function are known to a person skilled in the art. As a result of the method of production, at least one of the brake cylinders of a pair of brake cylinders is formed in such a way that a continuous hole is formed from the disk space through the housing to the outside. During assembly of the brake caliper, the brake pistons are inserted through this open brake cylinder from the outside into the brake caliper, and the assembly opening is closed by a closure element. Usually, the assembly opening, i.e. the end of the open brake cylinder is formed with an internal thread, and the closure unit is formed with an external thread. For closing the open brake cylinder, the closure element is screwed into the assembly opening using an appropriate tool.

Such a known brake caliper is shown, for example, in the article "Intensiv-Test, Yamaha XJR 1300" [Intensive test, Yamaha XJR 1300", Motorradfahrer [Motorcycle rider] magazine, November 2003 issue, pages 28 to 30.

The German Laid-Open Application DE 22 163 162 A describes a cast brake caliper in which the open side of the hole in which the brake piston is held is closed by means of a stopper which is inserted into the hole from the inside. This has the disadvantage that the assembly is very complicated, particularly because at least one piston can be used only after insertion of the stopper.

The German Laid-Open Application DE 25 27 700 A1 describes a cast brake caliper in which the open side of the hole is closed by means of a closure disk. A securing ring prevents the closure disk from falling out in an outward direction. The securing ring is accessible from the outside and can be removed in order to provide access to the closure disk for removal. This has the disadvantage that the brake caliper can accidentally be opened by the driver during repair or maintenance of the vehicle.

European Patent EP 1 256 740 A1 describes a brake caliper in which the open side of the hole is closed by means of a closure element. For securing the closure element, either the housing or the closure element is refashioned after the closure of the closure element. This has the disadvantage that assembly is very complicated and difficult.

The known brake calipers have the disadvantage that mounting of the closure element is complicated. Moreover, in some known brake calipers, there is the disadvantage that the brake caliper is opened accidentally by the driver during repair or maintenance of the vehicle or opens during operation due to the loads caused by the pressure changes in the system.

SUMMARY OF THE INVENTION

It is therefore the object of the invention to provide a brake caliper in which the closure element can be mounted easily and simply from the outside.

It is also the object of the invention to provide a brake caliper in which the closure element cannot be accidentally removed or preferably cannot be removed.

According to the invention, the brake caliper for a disk brake, in particular for motorcycles and/or bicycles, includes a housing in which a disk space for receiving a brake disk and a brake cylinder for receiving a brake piston are formed. The brake cylinder is connected to the disk space and has, on its side opposite to the disk space, an assembly opening through which the brake piston can be inserted into the brake cylinder. A closure element closes the assembly opening after insertion of the brake piston into the brake cylinder. A securing element secures the closure element in the assembly opening against forces in the direction of the main axis of the brake cylinder, the housing and the closure element enclosing the securing element.

This brake caliper has the advantage that the mounting of the closure element is substantially simplified and therefore more economical compared with the prior art because no screwing in and no torque monitoring during screwing in of the closure element are required. Moreover, there is the advantage that the closure element can no longer become detached by itself as a result of the loads caused by the pressure changes in the system. A further advantage is that the closure element can no longer be removed, and the brake caliper cannot be accidentally damaged.

According to a preferred embodiment of the invention, the securing element is a circlip. By this embodiment, it is possible to achieve a particularly simple design. Assembly, too, is very simple because the circlip need only spring into its place in order to secure the closure element.

A groove for receiving the securing element is preferably provided in the assembly opening. Accordingly, the closure element may have a groove for receiving the securing element.

According to an embodiment of the invention, a shoulder for supporting the closure element is provided in the housing, in the region of the assembly opening. A seal may be provided between the shoulder and the closure element. In this way, the sealing of the pressure space of the brake cylinder can be realized in a simple and safe manner.

According to an embodiment of the invention, a further brake cylinder which is intended for receiving a further brake piston which is arranged coaxially with the other brake cylinder is provided on that side of the disk space which is opposite to the assembly opening. During assembly, all brake pistons (and seals) are preferably inserted through the assembly opening before the assembly opening is closed by the closure element.

For safety reasons, it is advantageous if the closure element and the securing element are no longer removable after mounting of the closure element in the housing.

According to a preferred embodiment of the invention, a further brake cylinder for receiving a further brake piston which is arranged next to the other brake cylinder is provided, a closure element and a securing element according to the invention being provided.

The brake caliper according to the invention preferably has a plurality of pairs, in particular preferably two pairs, of brake cylinders, in each case a closure element and securing element according to the invention being provided on one side of the brake caliper for each pair of brake cylinders.

Advantageously, the housing of the brake caliper according to the invention is a forged part. Compared with housings of cast or milled parts, this has the advantage that the brake caliper can be made smaller while having the same strength. In particular, sufficient strength can be achieved in the region of the assembly opening for receiving the securing element (circlip), in order to absorb the forces occurring during braking.

WO 02/064991 A1 describes a brake caliper which is formed without cutting and has a shaft for receiving the brake linings, which is a cast or forged part. Housings for brake calipers having at least two shafts for receiving the brake linings are, on the other hand, usually cast or milled parts. It is not known to a person skilled in the art that housings for brake calipers of disk brakes having at least two shafts for receiving the brake linings can be formed as a forged part. Particularly in the case of housings having at least two shafts for receiving the brake linings, a person skilled in the art will assume that finishing of the shafts for the formation of the contact surfaces for the brake linings is required because the housing has to be removed from the forging dies in such a way that the forging dies are withdrawn simultaneously from both shafts in one direction, although the contact surfaces for the brake linings in the two shafts are differently oriented in order to ensure optimum contact. Due to the method, formations of undercuts are not possible in forging, because the forging dies can then no longer be removed for removing the housing from the die. In order to produce the housing for a brake caliper with at least two shafts as a forged part, finishing of the shafts by machining is therefore necessary for creating the optimum contact surfaces. This has the disadvantage that the production is very complicated and expensive. Moreover, the hardness and surface quality of the finished contact surfaces deteriorate.

It is therefore the object of the invention to provide a method for the production of a housing for a brake caliper as a forged part, which method is simple and economical.

According to the invention, the method for the production of a housing of a brake caliper for a disk brake, in particular for motorcycles and/or bicycles, having a plurality of shafts for receiving brake linings, which in each case comprise at least one contact surface with which the brake linings come into contact on braking of the vehicle for absorbing braking forces, includes the following steps:

a) formation of a pair of forging dies in such a way that the contours of the two forging dies define the contours of the housing to be produced, and the two forging dies define partitions in the shafts, in which excess material remains during forging, b) introduction of material into the first forging die, c) forging of the material using the pair of forging dies, and d) demolding of the housing by removal of the pair of forging dies, e) removal of the excess material of the partitions, the partitions in the shafts lying obliquely to the take-off direction of at least one of the forging dies.

It would also be possible to say that, according to the invention, the partitions in the shafts are inclined relative to the plane which is defined by a normal vector whose direction corresponds to the take-off direction of at least one of the forging dies.

As a result of the oblique position of the partitions, it is possible to form the contact surfaces in the desired optimum orientations in a forging process without producing undercuts. A one-part housing having a plurality of shafts can therefore be produced.

According to the invention, the partitions may also be curved, provided that no undercuts which prevent the removal of the forging dies are formed.

According to an embodiment of the method according to the invention, the partitions are advantageously formed outside the contact surfaces for the brake linings. Consequently, no burrs form on the contact surfaces as a result of removal of the partitions, with the result that there is the advantage that, on braking, the brake linings rest against a forged, burr-free contact surface which has not been finished. To this extent, on operation of the brake, the brake linings can easily move in the axial direction (on braking in the direction of the brake disk and on release of the brake away from the brake disk). Troublesome burrs need not be removed because the partitions are located outside the contact surfaces. This feature is particularly important during braking of the forward-moving vehicle, because high loads occur thereby.

The parting planes in the shafts are preferably at an angle of 1-45°, preferably 5 to 40°, particularly preferably 10 to 39°, particularly preferably 20 to 38°, particularly preferably 30 to 37°, and particularly preferably about 36°, relative to a plane which is defined by a normal vector whose direction corresponds to the take-off direction of at least one of the forging dies.

According to a preferred embodiment of the invention, the housing has two shafts. The parting planes are preferably arranged with mirror symmetry.

According to an embodiment of the invention, brake cylinders or pairs of brake cylinders for receiving brake pistons are formed in the housing after step d) and before step e) or after step e), preferably by turning, milling or drilling. The first alternative has the advantage that part of the partition is already removed during this processing step. This facilitates the subsequent step e).

The combination of forming the brake caliper according to the invention with a housing which is formed by a method according to the invention is particularly advantageous.

BRIEF DESCRIPTION OF THE DRAWINGS

Below, the brake caliper according to the invention and the method according to the invention are described in more detail with reference to an embodiment of the invention which is shown in the figures.

DESCRIPTION OF THE PREFERRED EMBODIMENTS

Figure 1:
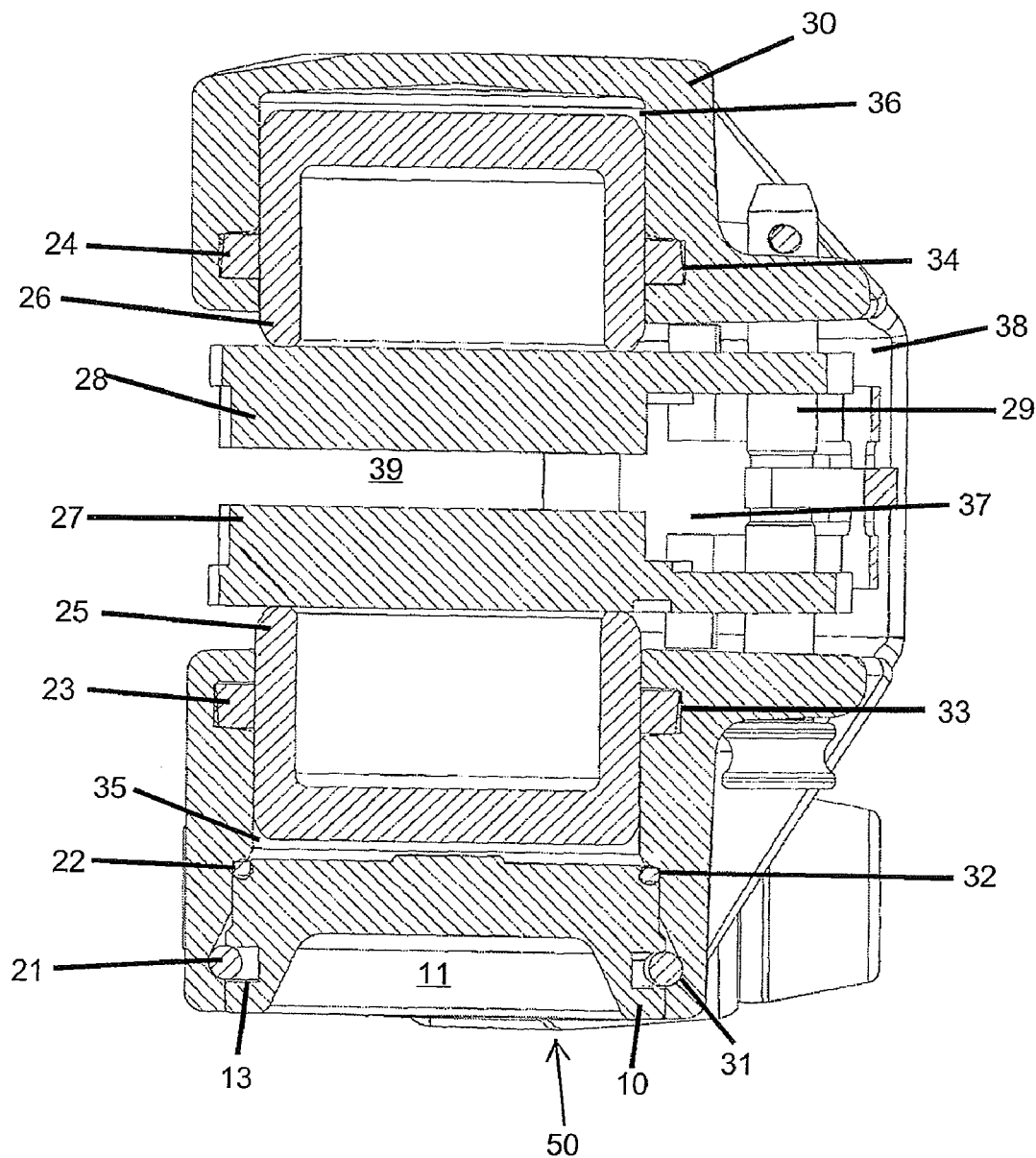
FIG. 1 shows a section through the brake caliper according to the invention, along the line I-I of FIG. 5.
Figure 5:
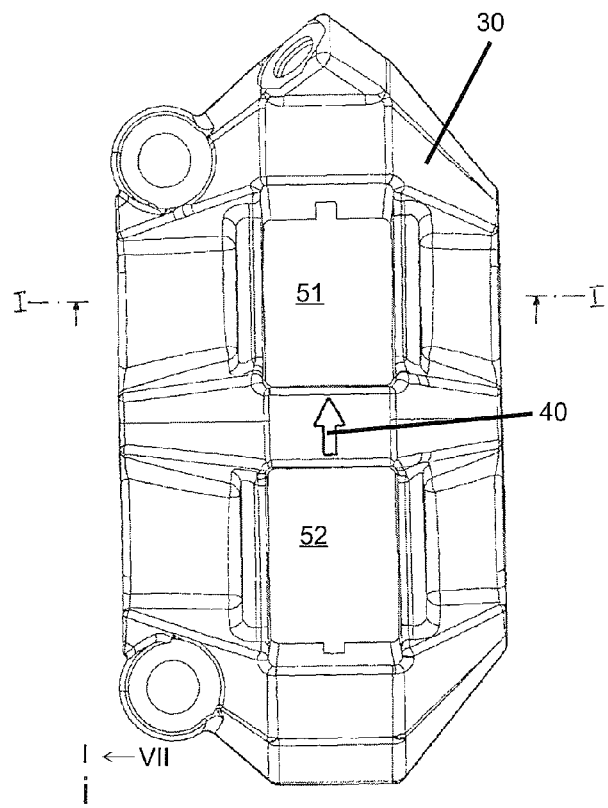
FIG. 5 shows a view of the brake caliper according to the invention from the front.

FIG. 1 shows a section through a housing of a brake caliper according to the invention, along the line I-I of FIG. 5. The housing 30 has a disk space 39 for receiving a brake disk which is not shown. The disk space 39 is part of a shaft which passes through the housing 30 and in which brake linings 27 and 28 are arranged in the side regions 37 and 38. Brake linings 27 and 28 are inserted into the shaft from the right side of FIG. 1, i.e. from the outside in the direction of the center of the brake disk which is not shown, and secured with a bolt 29. The housing 30 has two brake cylinders 35 and 36, in each of which a brake piston 25, 26 is arranged. The brake pistons 25, 26 are arranged on opposite sides of the disk space 39 and are subjected to pressure in a known manner during braking, in order to press the brake linings 27 and 28 against the brake disk. The cylinder walls are provided with grooves 33, 34 which hold square seals 23, 24 which seal the disk space 39 from the brake cylinder 35 and 36 and cause the brake pistons to return after braking in a known manner.

The housing of the brake caliper shown in FIG. 1 is a forged part. The brake cylinders 35 and 36 are formed by machining. The upper wall in FIG. 1 remains as an end wall of the brake cylinder 36. The brake cylinder 35 is open to the outside as a result of the machining. After insertion of the brake pistons 25 and 26, the brake cylinder 35 was closed by the closure element 10. The closure element 10 has a groove 13 in which a securing element 21 in the preferred form of a circlip is arranged. The housing 30 has a recess 31 which is partly engaged by the securing element 21. The securing element 21 secures the closure element 10 in the housing 30, in particular during braking, if a pressure which presses the closure element 10 in FIG. 1 downward is built up in the cylinder 35 by the brake fluid. Furthermore, a shoulder 32 in which the closure element 10 is supported by a seal 22 is formed in the housing 30. The seal 22 seals the pressure space of the brake cylinder 35 from the outside.

Figure 2:
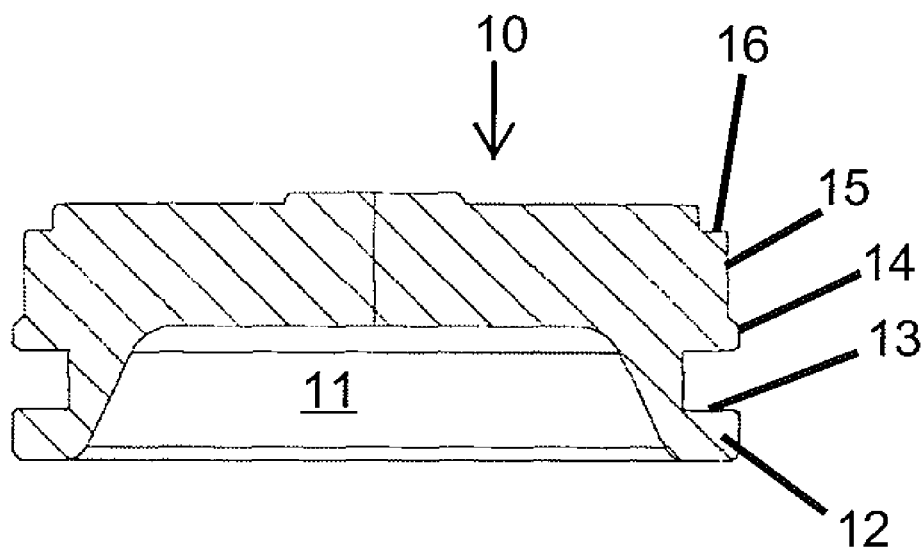
FIG. 2 shows a section through the closure element of the brake caliper of FIG. 1.

FIG. 2 shows a sectional view according to FIG. 1, of the closure element 10. The closure element 10 has a recess 11 on its outside. The recess serves for reducing the weight and can alternatively also be otherwise formed or omitted. Compared with the known closure elements, it has the advantage that it has a more appealing appearance and there is no danger of confusion owing to the fact that engagement sections for assembly tools are not necessary. The closure element 10 has a groove 13 for receiving the securing element 21, which groove is formed between an outer wall 12 and a section 14. The external diameter of the outer wall 12 corresponds to the internal diameter of the opening in the housing 30 into which the closure element 10 is inserted. It is therefore not possible to remove the closure element 10 from the outside because the securing element 21 is not accessible from the outside. The section 14 corresponds in its external diameter substantially to the external diameter of the outer wall 12. The external diameter of the section 15 is slightly smaller than the external diameter of the section 14. The external diameter of the section 15 corresponds substantially to the internal diameter of the opening in the housing 30 against which the closure element 10 rests after mounting. After mounting of the closure element 10, it is therefore also not possible to actuate the securing element 21 from the inside. Thus, after assembly is complete, the closure element 10 cannot be removed from the brake caliper. Since the pistons 25 and 26 are designed for a duration of operation which is substantially greater than the duration of operation of the vehicle, there is also no need to remove the closure element 10 again after assembly is complete. The closure element 10 furthermore has a recess 16 for receiving the seal 22.

Figure 3:
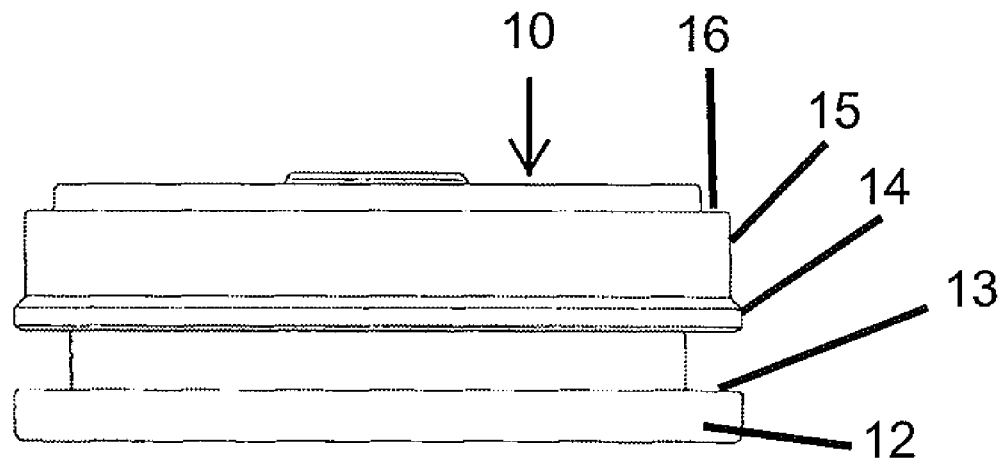
FIG. 3 shows a side view of the closure element of FIG. 1.

FIG. 3 shows a side view of the closure element 10 of FIG. 1. The description of FIG. 3 substantially corresponds to that of FIG. 2 and will not be repeated here.

For mounting of the closure element 10, the closure element 10 is introduced together with the securing element 21 via a funnel device into a sleeve whose internal diameter corresponds to the internal diameter of the assembly opening 50. The sleeve is placed on the housing 30 and the closure element 10 is pushed with the securing element 21 into the assembly opening 50 until the closure element 10 comes into contact with the seal 22. At the same time, the securing element 21 reaches the region of the recess 31. The securing element 21 is a circlip which is prestressed and snaps into the recess 31. Half of the securing element 21 is arranged in the recess 31 and the other half in the groove 13 of the closure element 10. The closure element 10 is secured in the assembly opening 50 by the securing element 21.

Figure 4:
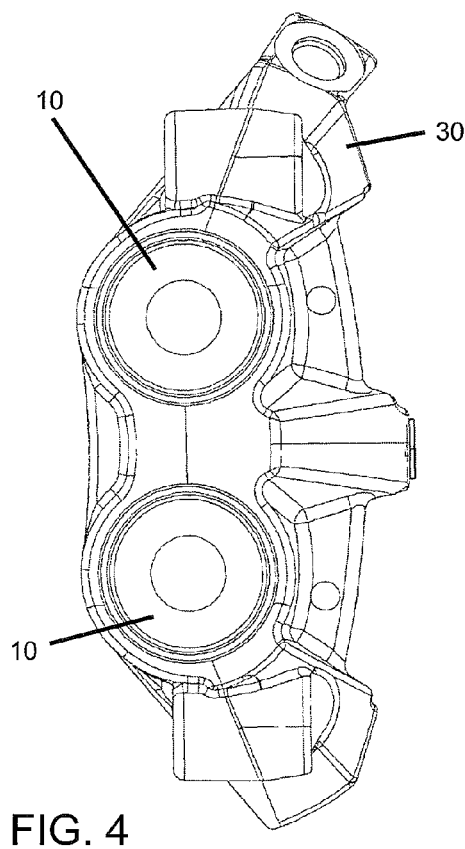
FIG. 4 shows a side view of the brake caliper according to the invention, of FIG. 1.

FIG. 4 shows the housing of the brake caliper according to the invention from the side. The housing 30 has two pairs of brake cylinders. The two closure elements 10 are shown in FIG. 4.

FIG. 5 shows the brake caliper according to the invention from the front. The arrow 40 indicates the direction of rotation of the brake disk during the forward travel of the vehicle. The housing 30 has two shafts 51 and 52 for receiving pairs of brake linings which are not shown.

Figure 6:
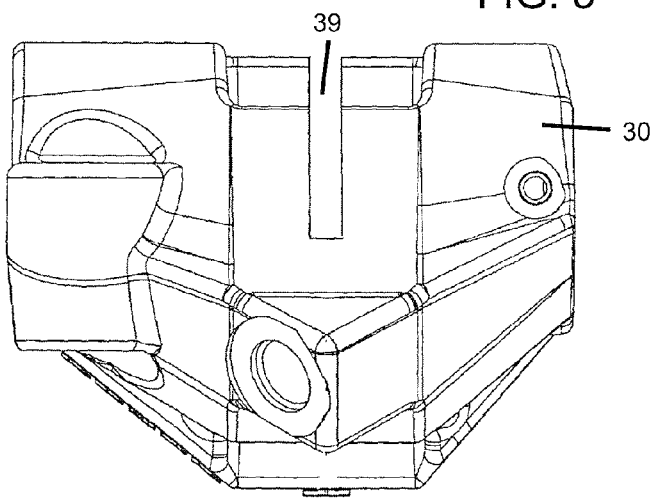
FIG. 6 shows a view of the brake caliper according to the invention from above.

FIG. 6 shows a view of a housing of the brake caliper according to the invention from above.

Figure 7:
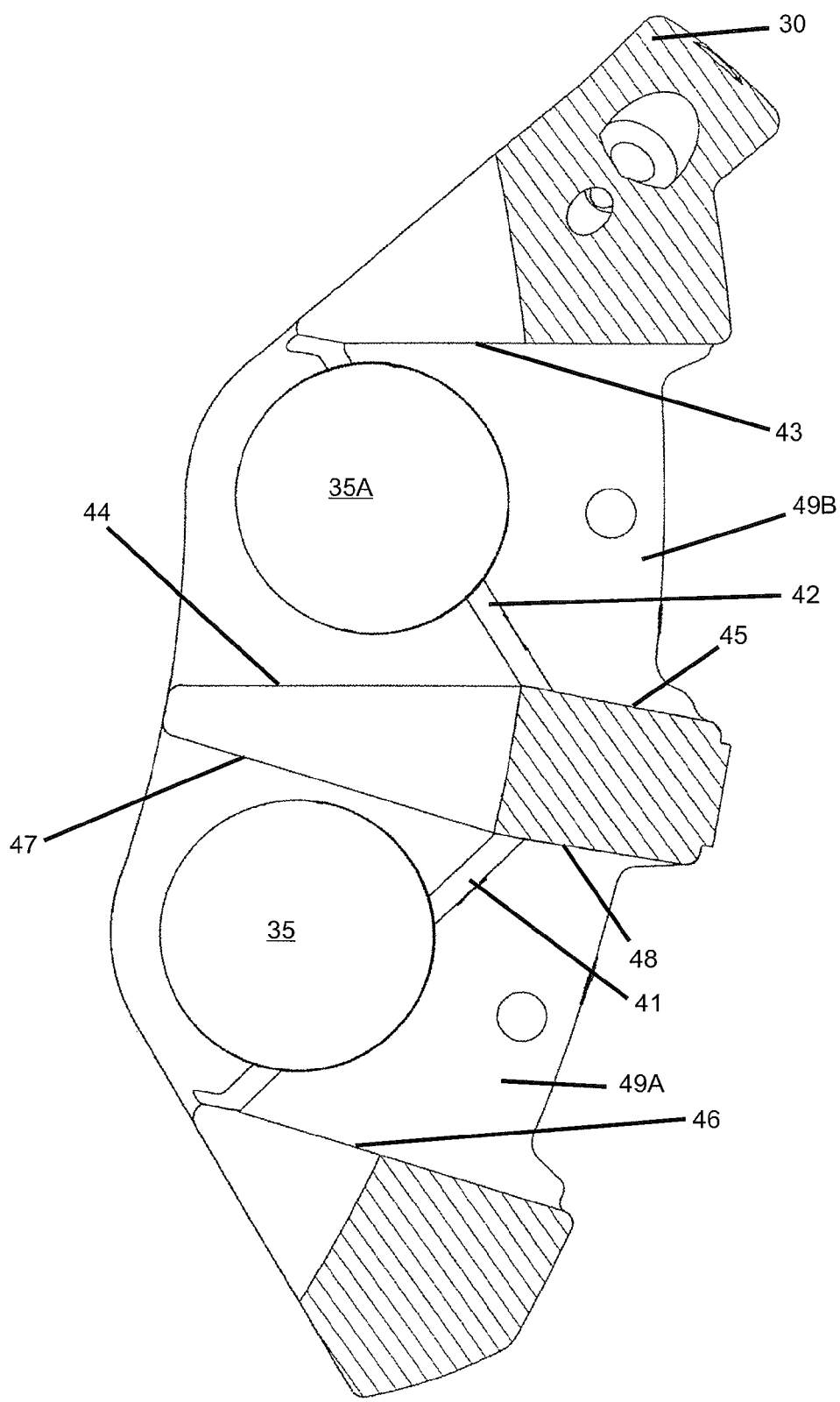
FIG. 7 shows a section through the brake caliper according to the invention, of FIG. 1, along the line VII-VII of FIG. 6, the position of the partitions formed during forging in the two shafts being indicated.

FIG. 7 shows a section through the housing of the brake caliper according to the invention, along the line VII-VII of FIG. 6. The housing has two shafts 49A and 49B, each of which holds a pair of brake linings which is not shown. The shaft 49A has a contact surface 47 on which the brake lining is supported during braking of the vehicle if the forward-moving vehicle is to be braked. The shaft 49B has a corresponding contact surface 43. During backward movement, the brake linings which are not shown are supported on the contact surfaces 44 and 46 during braking.

FIG. 7 shows the housing 30 in a processing state in which the cylinders 35A and 35 have already been formed in the housing 30. The partitions 41 and 42 from the forging method have not yet been removed. The partition 41 has an angle of 36° relative to the direction in which one forging die is withdrawn, i.e. the forging die which is withdrawn in the direction of the center of the brake disk. The partition 41 runs from that end of the contact surface 47 which faces away from the brake disk to that end of the contact surface 46 which faces the brake disk. The partition 42 is formed with mirror symmetry relative to the partition 41 in the shaft 49B. It runs from that end of the contact surface 43 which faces the brake disk to that end of the contact surface 44 which faces away from the brake disk.

The partitions 41 and 42 are removed from the housing in a manner known to a person skilled in the art. Since the partitions are located outside the contact surfaces 43 and 47, it is not necessary to finish the contact surfaces. Owing to the oblique arrangement of the partitions 41 and 42, it is possible to arrange the contact surfaces 43 and 47 at various angles to one another and at the same time to permit demolding of the housing 30 after the forging process. Owing to the oblique arrangement of the partitions 41 and 42, no undercuts which would make the demolding process impossible form.

Figure 8:
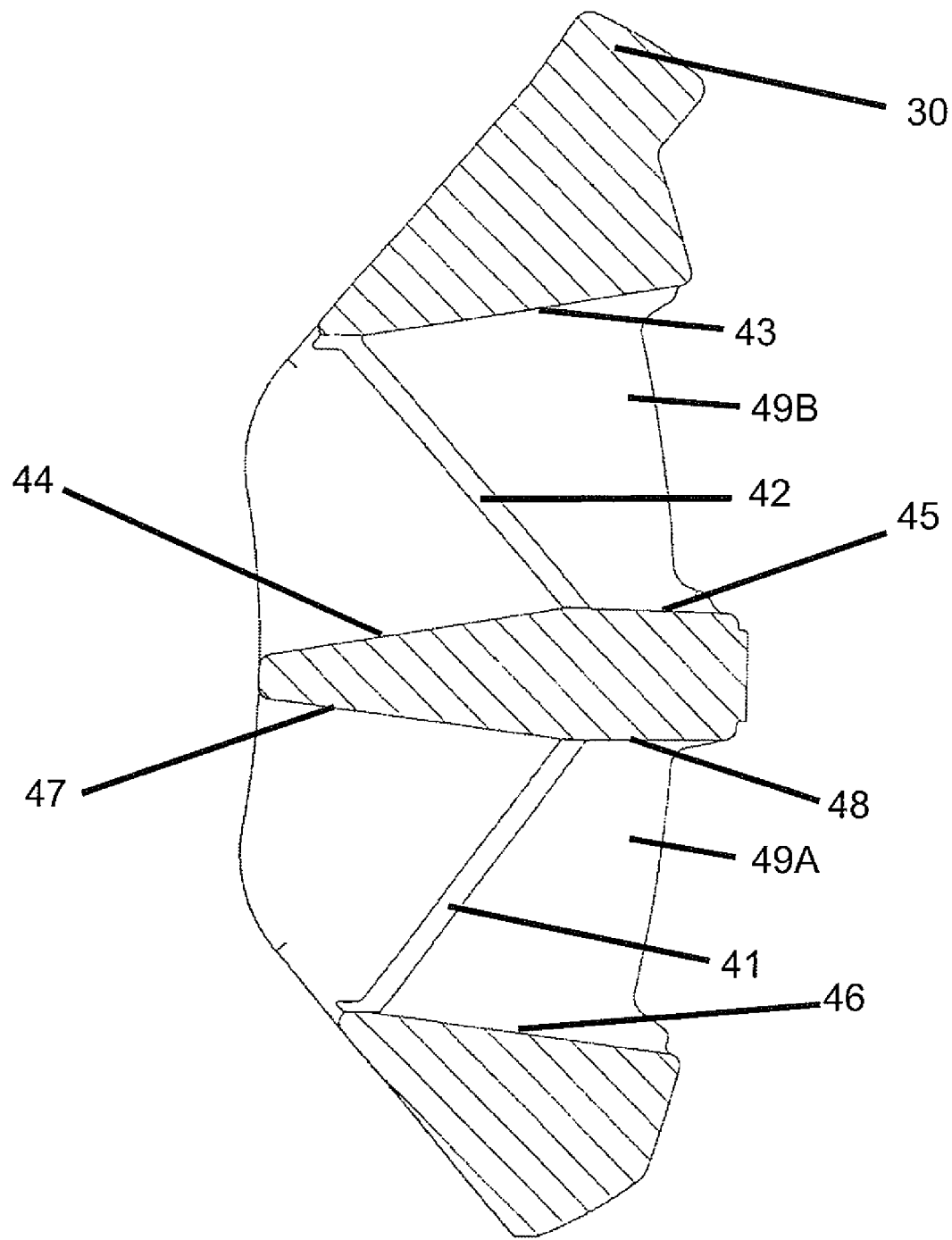
FIG. 8 shows a schematic side view of the housing for a brake caliper according to FIG. 7 before the formation of the brake cylinders.
Figure 9:
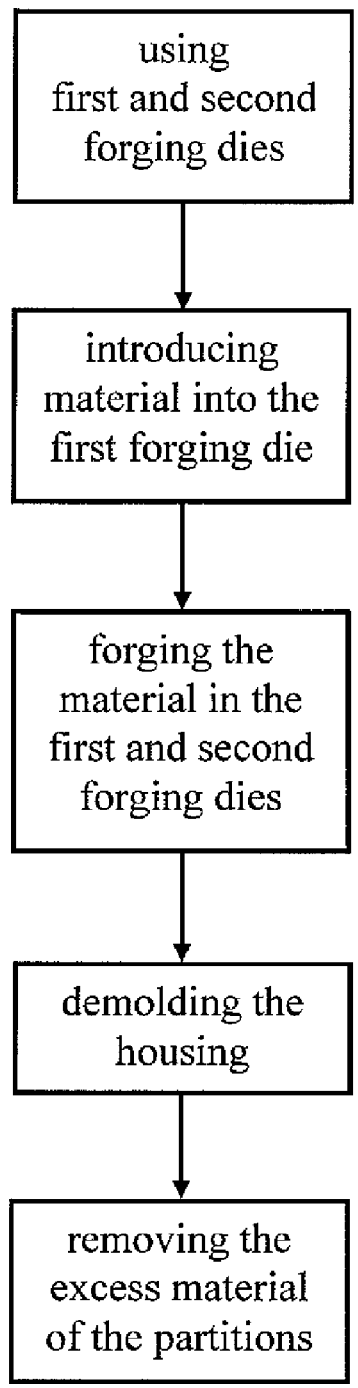
FIG. 9 shows a schematic view of the method for the production of the housing for a brake caliper according to the invention.
Figure 10:
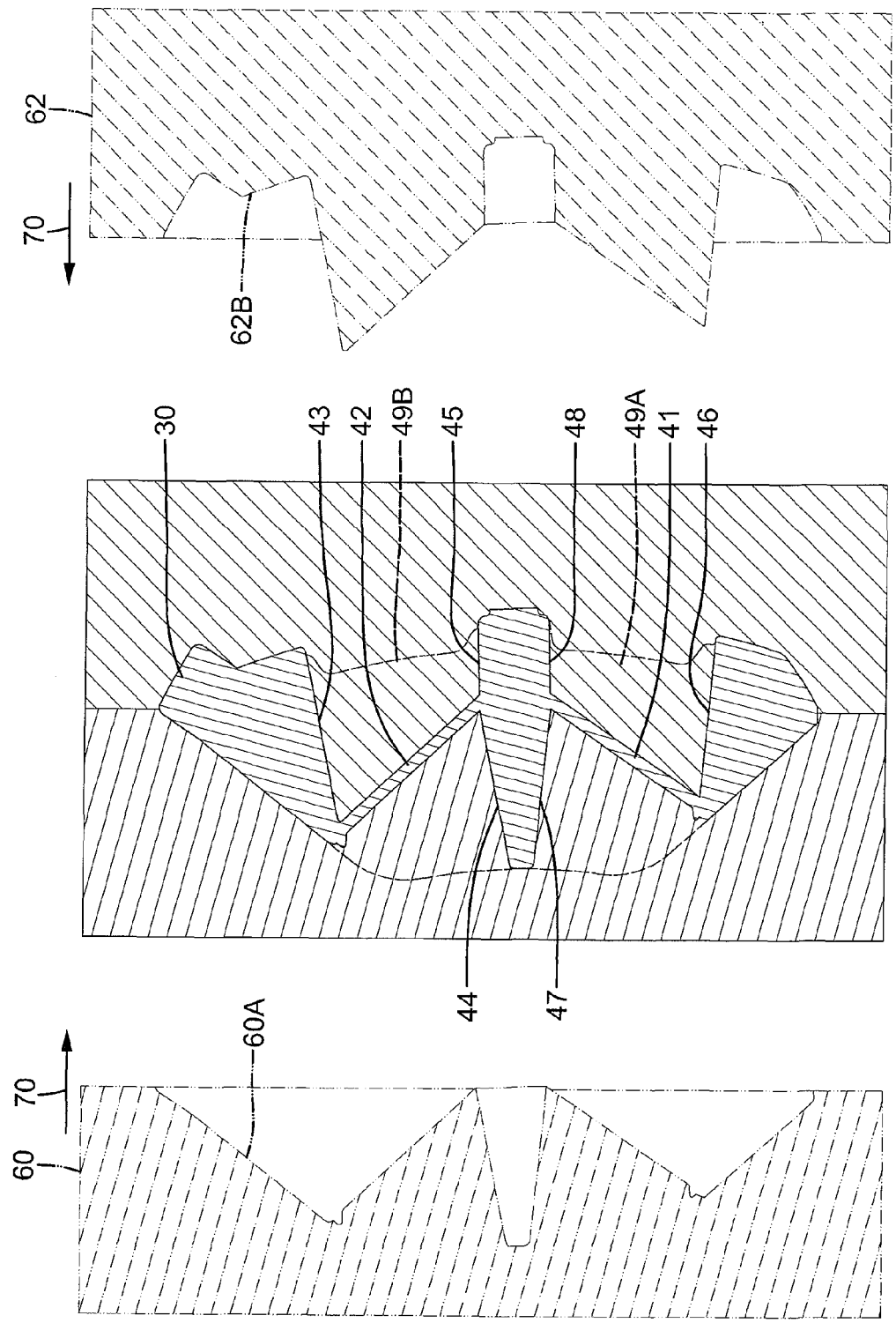
FIG. 10 shows a schematic cross sectional view of the forging process for the housing for a brake caliper according to the invention.

FIG. 8 shows a sectional view, corresponding to FIG. 7, of the housing according to the invention of the brake caliper according to the invention in an earlier processing step immediately after the forging process shown in FIG. 10. Process steps for the formation of the brake cylinders and of the disk space and the passage for bolts and attachments have not yet been formed. Particularly, first and second forging dies 60 and 62 are used having contours 60A and 62B which define contours of housing 30 to be produced. Material introduced into one of the forging dies 60 and 62 is forged in the first and second forging dies 60 and 62, with excess material forming the partitions 41 and 42 in the shafts 49A and 49B of the housing 30. The housing 30 is demolded by removing the first and second forging dies in a take-off direction 70. The section of FIG. 8 shows the continuous partitions 41 and 42 which remain after the forging process. By the formation of the brake cylinders 35 and 35A shown in FIG. 7, the partitions 42 and 41 are partly removed. The remaining parts of the partitions 41 and 42 are then removed. Alternatively, the partitions 41 and 42 could also be completely removed before the formation of the brake cylinders 35 and 35A.

The invention claimed is:

1. A method for the production of a housing of a brake caliper for a disk brake comprising a plurality of shafts for receiving brake linings, wherein each shaft includes at least one contact surface against which the brake linings rest on during braking for absorption of braking forces, comprising:
    a) using first and second forging dies wherein contours of the first and second forging dies define the housing to be produced;
    b) introducing material into the first forging die;
    c) forging the material in the first and second forging dies, with forging the material including defining partitions in the plurality of shafts of the housing, in which excess material remains during forging,
    d) demolding the housing by removing the first and second forging dies in a take-off direction; and
    e) removing the excess material of the partitions,
    wherein the partitions in the shafts are located obliquely to the take-off direction of at least one of the first and second forging dies, and wherein the partitions are formed outside the contact surfaces for the brake linings.

2. A method for the production of a housing of a brake caliper for a disk brake comprising a plurality of shafts for receiving brake linings, wherein each shaft includes at least one contact surface against which the brake linings rest on during braking for absorption of braking forces, comprising:
    a) using first and second forging dies wherein contours of the first and second forging dies define the housing to be produced;
    b) introducing material into the first forging die;
    c) forging the material in the first and second forging dies, with forging the material including defining partitions in the plurality of shafts of the housing, in which excess material remains during forging,
    d) demolding the housing by removing the first and second forging dies in a take-off direction; and
    e) removing the excess material of the partitions,
    wherein the partitions in the shafts are located obliquely to the take-off direction of at least one of the first and second forging dies, and wherein the partitions in the shafts are inclined at an angle of 1-45° relative to a plane which is defined by a normal vector whose direction corresponds to the take-off direction of at least one of the first and second forging dies.

3. The method as claimed in claim 2, wherein the partitions in the shafts are inclined at an angle of 10-40° relative to the plane which is defined by the normal vector whose direction corresponds to the take-off direction of at least one of the first and second forging dies.

4. The method as claimed in claim 3, wherein the partitions in the shafts are inclined at an angle of 20-38° C. relative to the plane which is defined by the normal vector whose direction corresponds to the take-off direction of at least one of the first and second forging dies.

5. A method for the production of a housing of a brake caliper for a disk brake comprising a plurality of shafts for receiving brake linings, wherein each shaft includes at least one contact surface against which the brake linings rest on during braking for absorption of braking forces, comprising:
    a) using first and second forging dies wherein contours of the first and second forging dies define the housing to be produced;
    b) introducing material into the first forging die;
    c) forging the material in the first and second forging dies, with forging the material including defining partitions in the plurality of shafts of the housing, in which excess material remains during forging,
    d) demolding the housing by removing the first and second forging dies in a take-off direction; and
    e) removing the excess material of the partitions,
    wherein the partitions in the shafts are located obliquely to the take-off direction of at least one of the first and second forging dies, and wherein the plurality of shafts has three shafts.

6. A method for the production of a housing of a brake caliper for a disk brake comprising a plurality of shafts for receiving brake linings, wherein each shaft includes at least one contact surface against which the brake linings rest on during braking for absorption of braking forces, comprising:
    a) using first and second forging dies wherein contours of the first and second forging dies define the housing to be produced;
    b) introducing material into the first forging die;
    c) forging the material in the first and second forging dies, with forging the material including defining partitions in the plurality of shafts of the housing, in which excess material remains during forging,
    d) demolding the housing by removing the first and second forging dies in a take-off direction; and
    e) removing the excess material of the partitions,
    wherein the partitions in the shafts are located obliquely to the take-off direction of at least one of the first and second forging dies, and wherein brake cylinders for receiving brake pistons are formed in the housing after demolding the housing by turning, milling or drilling.

* * * * *